April 28, 1953      E. A. WINTER      2,636,806
ACIDULATION OF PHOSPHATE ROCK
Filed May 19, 1950
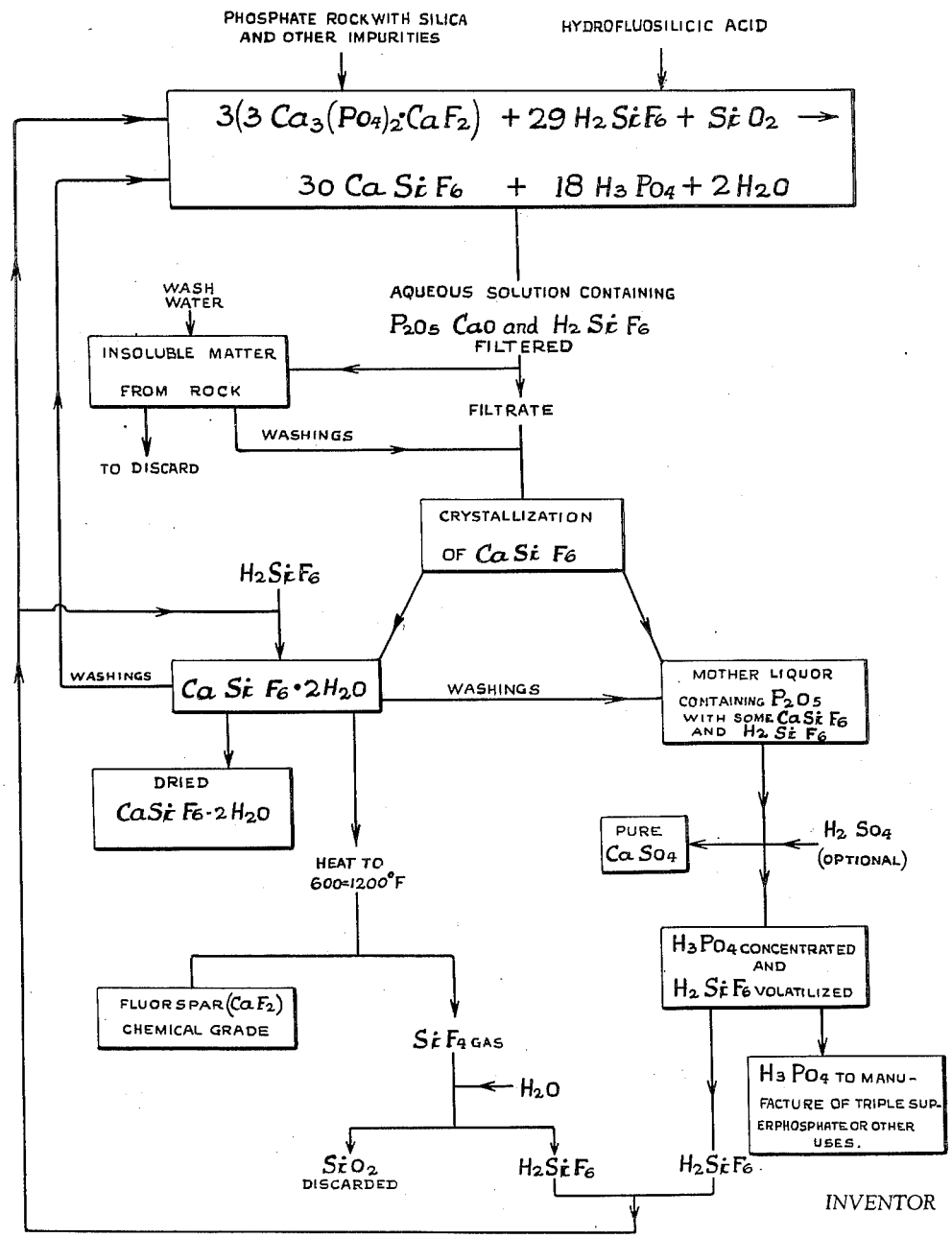
INVENTOR
*Ernest A. Winter.*
BY *Cameron, Kerkam & Sutton*
ATTORNEYS

UNITED STATES PATENT OFFICE 2,636,806

ACIDULATION OF PHOSPHATE ROCK

Ernest A. Winter, College Park, Ga., assignor to Tennessee Corporation, New York, N. Y., a corporation of New York Application May 19, 1950, Serial No. 163,106

11 Claims. (Cl. 23—88)

This invention relates to the acidulation of phosphate rock and to the additional processing of the acid mix to convert the constituents of the rock into the useful products mentioned hereinafter with conservation of its phosphorous, calcium and fluorine content.

The major constituent of phosphate rock, commonly known as apatite or fluorapatite, is represented by the formula $3Ca_3(PO_4)_2.CaF_2$. Impurities are commonly present also, such as iron and aluminum compounds, calcium carbonate, and silica, but such impurities are of little or no value and are substantially eliminated in processes embodying the invention. Such phosphate rock is commonly used as a starting material in the manufacture of phosphate fertilizers. In making the so-called "superphosphate," for example, the rock is acidulated with sulphuric acid and the following reaction takes place:

(1) $3Ca_3(PO_4)_2.CaF_2 + 7H_2SO_4 \rightarrow$
$7CaSO_4 + 3Ca(H_2PO_4)_2 + 2HF$ The mixture of $CaSO_4$ and $Ca(H_2PO_4)_2$ is called superphosphate, because monocalcium phosphate is readily available for fertilizer purposes. However, the calcium sulphate or gypsum is an inert ingredient and the $P_2O_5$ content of the mixture, which is a measure of its fertilizing strength, is only about 20%.

The hydrofluoric acid produced in the above reaction combines with silica impurity in the rock to form silicon tetrafluoride according to the equation (2) $4HF + SiO_2 \rightarrow 2H_2O + SiF_4$ The effluent $SiF_4$ gas, however, is an objectionable contaminant of the atmosphere and is therefore absorbed in water to form hydrofluosilicic acid according to the equation (3) $3SiF_4 + 2H_2O \rightarrow 2H_2SiF_6 + SiO_2$ Phosphate rock is also used in the production of the so-called "triple superphosphate." In this case the rock is first acidulated with more sulphuric acid than in Equation 1 as follows:

(4) $3Ca_3(PO_4)_2.CaF_2 + 10H_2SO_4 \rightarrow$
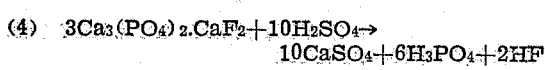
$10CaSO_4 + 6H_3PO_4 + 2HF$ Sufficient water is used to yield about a 30% solution of phosphoric acid, which is filtered from the precipitated calcium sulphate. The phosphoric acid solution contains an appreciable amount of hydrofluosilicic acid ($H_2SiF_6$) produced according to Equations 2 and 3, but this acid is subsequently volatilized during concentration of the phosphoric acid to about 65% in preparation for the next step, the vapors being usually absorbed in water. The 65% solution of $H_3PO_4$ is then used to acidulate more phosphate rock as follows:

(5) $3Ca_3(PO_4)_2.CaF_2 + 14H_3PO_4 \rightarrow$
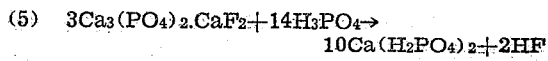
$10Ca(H_2PO_4)_2 + 2HF$ Since in this case the monocalcium phosphate contains little calcium sulphate impurity, its $P_2O_5$ content will be roughly 48% as compared with 20% in the case of superphosphate. The evolved HF is again converted into $H_2SiF_6$ according to Equations 2 and 3.

In both of the above methods, the amount of sulphuric acid required is considerable, being equivalent to the amount of calcium sulphate formed regardless of the source of the calcium, but the impure calcium sulphate formed (or its dihydrate $CaSO_4.2H_2O$) has practically no use whatever and in most cases creates a severe disposal problem. Thus acidulation of phosphate rock with sulphuric acid brings about a substantial economic loss, and it is one of the objects of the present invention to avoid this loss by eliminating the use of sulphuric acid for this purpose.

Some of the hydrofluosilicic acid produced in the above processes by reaction between evolved hydrofluoric acid, silica and water (Equations 2 and 3) is sold as such and some is converted into fluosilicates, as for example by adding sodium chloride to produce sodium fluosilicate. However, a large part of the hydrofluosilicic acid is thrown away with resultant loss of fluorine values as well as the creation of disposal problems. Another object of the invention is to avoid this further economic loss and to solve the disposal problems by using the hydrofluosilicic acid for acidulation of the phosphate rock in place of sulphuric acid.

A further object of the invention resides in the production from the phosphate rock thus acidulated of phosphoric acid of grade and quality suitable for making triple superphosphate according to Equation 5. Hechenbleikner U. S. Patent No. 1,313,379 states that when phosphate rock is acidulated with hydrofluosilicic acid, the phosphoric acid obtained is easily filtered and is of greater purity than that obtained in Reaction 4. In the present process, on the contrary, the phosphoric acid produced by the acidulation is highly impure, containing a major proportion of dissolved impurities which cannot be filtered. For example, the solution in a typical instance contained only 90 g. $H_3PO_4$/liter and about 300 g.

CaSiF₆/liter. The present invention separates these impurities and produces phosphoric acid that is suitable for the purpose mentioned above.

Still further objects are to recover most of the calcium and a large part of the fluorine of the phosphate rock in the form of valuable by-products instead of the relatively worthless and discarded calcium sulphate and the excess hydrofluosilicic acid of the prior processes mentioned above. One of these by-products is calcium fluosilicate (CaSiF₆) having a high degree of purity. Relatively stable fluosilicates such as sodium fluosilicates are easily produced, but pure calcium fluosilicate is difficult to make because of its tendency to decompose, and the commercial supplies of this material have been of varying composition and poor quality. The present invention produces calcium fluosilicate of a high degree of purity, e. g., 95–99%.

Another important by-product which is produced inexpensively and on a commercial scale by the present invention is calcium fluoride or fluorspar (CaF₂). This material is chiefly useful as a flux in the metal industry, as an opacifier in the ceramic industry, and as a raw material in the manufacture of hydrofluoric acid, and its importance for these purposes is so great that it is considered a strategic mineral. However, the fluorine content of phosphate rock has not been readily available heretofore in a usable form for the chemical industry. U. S. Patent No. 2,410,043 discloses a method of producing molten calcium fluoride by decomposing calcium fluosilicate at a temperature of 1300° C. (2372° F.), but the amount of heat required is excessive and it is difficult to handle the calcium fluoride in the molten state. In contrast, the relatively pure calcium fluosilicate produced by the present invention as stated above can be decomposed readily at temperatures as low as 600° F. with evolution of SiF₄ gas and resultant production of fluorspar in solid state and containing less than 1% silica. This product meets acid grade specifications for fluorspar.

Another object is to conserve excess fluorine resulting from the purification of phosphoric acid and production of fluorspar in the form of hydrofluosilicic acid for re-use in the acidulation of more phosphate rock or for any other desired purpose.

Another object is to convert excess calcium into high grade calcium sulphate or gypsum substantially free of silica and other impurities from the rock.

The above and other objects will be better understood from the following general description of the invention and the accompanying diagrammatic flow sheet which illustrates one embodiment thereof. It will be understood, however, that the invention is not restricted to this embodiment and that reference should be had to the appended claims for a definition of its limits.

The first step in the process comprises mixing hydrofluosilicic acid with phosphate rock (containing the usual silica impurity) to dissolve a substantial part or all of its P₂O₅ content and a substantial part or essentially all of its CaO content. Using proportions of rock and acid that are preferred in most cases, the reaction is represented by the following equations:

(6) $3(3Ca_3(PO_4)_2 \cdot CaF_2) + 29H_2SiF_6 + SiO_2 \rightarrow 30CaSiF_6 + 18H_3PO_4 + 2H_2O$.

The result of the above reaction is an aqueous solution containing P₂O₅ and also CaO and H₂SiF₆ (equivalent to CaSiF₆+H₂O), or in other words dilute and very impure phosphoric acid. The solution also contains substantial quantities of insoluble impurities from the rock which may be separated in any suitable manner as by filtration, centrifuging or decantation. Such separation of impurities is not essential, but is preferable because unless the insoluble impurities are removed, the calcium fluosilicate and calcium fluoride subsequently recovered will be of poorer quality. According to the proportions of the reagents in Equation 6, the solid residue thus obtained may be substantially free of P₂O₅ in which case it is discarded, or substantial amounts of P₂O₅ may be left in the residue in which case it can be used for fertilizer purposes or worked up in any suitable manner to recover P₂O₅.

When freed of insoluble impurities, the solution is treated in any suitable manner to precipitate calcium fluosilicate without precipitating any substantial amount of phosphorous compound. The preferred manner is to concentrate the solution by evaporation to crystallize out the calcium fluosilicate, although the latter may be salted out by the addition of a suitable salting out agent such as acetone, ethanol, or methanol. The calcium fluosilicate is then separated from the solution by mechanical means such as decantation, filtration, or centrifuging and preferably washed with hydrofluosilicic acid to remove any remaining P₂O₅. The resulting product is of very high purity (95–99%), as shown by the following typical analyses:

| Sample No. | P₂O₅, Percent | N NaOH/g., actual cc. | N NaOH/g., theoretical cc. |
|---|---|---|---|
| 1 | 0.12 | 18.30 | 18.35 |
| 2 | 0.11 | 18.23 | 18.35 |
| 3 | 0.10 | 18.34 | 18.35 |

Some of this calcium fluosilicate (or calcium silicofluoride) can be dried and sold as such for use in the ceramics industry or for any other desired purpose. Ordinarily, however, a large part of it will be converted to calcium fluoride because of the greater demand for this product. Sodium and potassium fluosilicates, and especially the latter, are decomposable by heat only with much difficulty, and the decomposition of previous calcium fluosilicates has required the use of excessive temperatures as noted above. The calcium fluosilicate produced by the present invention, on the other hand, decomposes very readily and completely below the fusion point. For example, one hour at 1200° F. is sufficient for complete decomposition. Somewhat longer but not excessive time of heating is needed at lower temperatures down to 600° F. Decomposition will take place at still lower temperatures such as 500° F., but is undesirably slow. Temperatures higher than 1200° F. can of course be used, but at the expense of wasting heat.

The CaSiF₆ is thus decomposed into CaF₂ (fluorspar) with evolution of SiF₄ gas. The fluorspar obtained is of high grade, containing less than 1% silica and meeting the specifications for silica in chemical grade fluorspar. However, if this product is to be used for making hydrofluoric acid, the calcium fluosilicate crystals need not be washed with hydrofluosilicic acid as described above, because any phosphoric acid remaining in the fluorspar is not readily volatile and will not contaminate the hydrofluoric acid.

The mother liquor from the calcium fluosilicate crystallization is a solution of phosphoric acid containing only small amounts of CaO and $H_2SiF_6$ ($CaSiF_6 + H_2O$), the presence of which will not matter seriously when the phosphoric acid is to be used for fertilizer purposes as in Equation 5. On the other hand, if still purer phosphoric acid is desired, any excess calcium remaining in the mother liquor can be removed by the addition of the quantity of sulphuric acid required to precipitate it in the form of calcium sulphate or gypsum. The gypsum thus obtained is relatively pure and of high grade as compared with that precipitated in Equations 1 and 4 which is contaminated with a large amount of impurities, notably silica.

For making fertilizer, the mother liquor (dilute phosphoric acid solution) can be concentrated to any desired degree, say from 30% to 65%. During this concentration any remaining hydrofluosilicic acid is largely volatilized and can be recovered for re-use in the process. The concentrated phosphoric acid can be used for any desired purpose, but is well adapted for the manufacture of triple superphosphate according to Equation 5.

The invention is more fully illustrated by the following detailed example:

A phosphate rock containing 32.95% $P_2O_5$ is ground to 100 mesh to facilitate the decomposition. 300 g. of this ground rock is added, with stirring, to 2000 cc. of hydrofluosilicic acid containing approximately 240 g. $H_2SiF_6$/liter. Some foaming occurs as the acid reacts with the small amount of calcium carbonate present in the rock. About one hour of stirring is sufficient to completely decompose the rock. No heat is applied, the reaction taking place at room temperature.

The batch is filtered, and the cake is washed twice with 300 cc. of water. The first washings are added to the filtrate, and the second washings, amounting to 400 cc. containing 10.1 g. of $P_2O_5$, are used for washing the next batch. The solid residue weighs 250–300 g. wet and about 100 g. dry and contains only 0.5 g. of $P_2O_5$. This residue is discarded because it contains very little $P_2O_5$. The extraction is 99.5%.

The filtrate plus first wash water amounts to about 2000 cc. This solution contains the major portion of the $P_2O_5$ from the rock, and also the major portion of its CaO. The solution is evaporated down to about 500 cc., during which time partial crystallization of calcium fluosilicate takes place. Upon cooling to room temperature 500–600 g. of wet heavy crystals of $CaSiF_6 \cdot 2H_2O$ are obtained. These crystals readily separate from the mother liquor upon centrifuging or filtering. The crystals are heavy and settle rapidly, and so a major portion of the mother liquor may be decanted off. The crystals are washed with 250–300 cc. of $P_2O_5$-free 30% $H_2SiF_6$, and dried to yield about 450 g. of very pure $CaSiF_6 \cdot 2H_2O$.

The hydrofluosilicic acid used for washing may be combined with the mother liquor, or used for acidulating more phosphate rock.

The mother liquor from the $CaSiF_6 \cdot 2H_2O$ crystals will contain about 95 g. of $P_2O_5$ in the form of phosphoric acid, and also some $CaSiF_6$ and $H_2SiF_6$. It can be used for making triple superphosphate as indicated in Equation 5, in which case it is evaporated down to about 65% $H_3PO_4$. During this concentration a large part of the remaining hydrofluosilicic acid is volatilized for reuse in the process. Furthermore, if desired the mother liquor is treated before concentration with sulphuric acid to produce a relatively small quantity of calcium sulphate which can be readily marketed because of its high quality.

That part of the calcium fluosilicate which is not sold as such is converted into calcium fluoride by heating to 600° F.–1200° F. for an hour or more until decomposition is substantially complete. For every 100 g. of $CaSiF_6 \cdot 2H_2O$ calcined, there will be left about 36 g. of $CaF_2$ containing less than 1% $SiO_2$, which meets the specification for silica in chemical grade fluorspar.

The evolved $SiF_4$ is reacted with water to form $P_2O_5$-free $H_2SiF_6$ which is combined with that volatilized from the mother liquor during concentration and used for washing $CaSiF_6 \cdot 2H_2O$ crystals or in the acidulation of the next batch of rock. Thus fluorine recoveries are quite high.

It is to be understood that the invention is not restricted to the details set forth in the foregoing description for purposes of illustration and that reference should be had to the appended claims for a definition of its limits.

What is claimed is:

1. A method for the manufacture of substantially pure calcium fluosilicate and phosphoric acid from phosphate rock containing calcium as calcium fluoride and free silica in the amount of at least one mol of $SiO_2$ per mol of Ca as $CaF_2$ which comprises mixing phosphate rock with an acid solution consisting essentially of hydrofluosilicic acid and water in the proportion of one mol of acid per mol of calcium in the phosphate rock as calcium phosphate and at least two mols of acid for each three mols of calcium in the phosphate rock as calcium fluoride, thereby dissolving calcium and phosphorous compounds from the rock and forming a solution of phosphoric acid and calcium fluosilicate, separating said solution from the residue of undissolved impurities from the rock, then concentrating the resultant solution by evaporation and separating as a precipitate a crystalline substantially pure calcium fluosilicate from said solution, and separating the precipitated calcium fluosilicate mechanically from the remaining phosphoric acid solution.

2. The method defined in claim 1 wherein the separated calcium fluosilicate is heated to evolve silicon tetrafluoride and to form calcium fluoride.

3. The method defined in claim 1 wherein the separated calcium fluosilicate is heated below melting temperature of calcium fluoride to evolve silicon tetrafluoride and to form calcium fluoride.

4. The method defined in claim 1 wherein sulphuric acid is added to said remaining phosphoric acid solution to precipitate remaining calcium in the form of calcium sulphate and said calcium sulphate is then separated mechanically from the phosphoric acid solution.

5. A method for the manufacture of substantially pure calcium fluosilicate and phosphoric acid from phosphate rock having the approximate formula $3Ca_3(PO_4)_2 \cdot CaF_2$ and containing silica which comprises mixing phosphate rock with an acid solution consisting essentially of hydrofluosilicic acid and water in the proportion of one mol of acid per mol of calcium in the phosphate rock as $Ca_3(PO_4)_2$ and two mols of acid for each three mols of calcium in the phosphate rock as $CaF_2$ thereby dissolving the calcium and phosphorous compounds from the rock and forming a solution of phosphoric acid and calcium fluosilicate, concentrating said solution by evaporation, and mechanically separating the resultant crystallized substantially pure calcium fluosilicate from the remaining solution of phosphoric acid.

6. The method defined in claim 5 in which the separated calcium fluosilicate crystals are heated to a temperature between 500° F. and melting temperature of calcium fluoride to evolve silicon tetrafluoride and produce calcium fluoride.

7. The method defined in claim 6 wherein the evolved silicon tetrafluoride is combined with water and at least part of the resultant hydrofluosilicic acid is recycled and mixed with phosphate rock.

8. The method defined in claim 5 wherein said remaining phosphoric acid solution is purified by addition of sulphuric acid to precipitate remaining calcium in the form of calcium sulphate partly to be mixed with the phosphate rock and partly to wash the calcium fluosilicate crystals.

9. The method defined in claim 5 wherein said separated calcium fluosilicate crystals are washed with hydrofluosilicic acid and the washings added to said remaining phosphoric acid solution.

10. The method defined in claim 9 wherein said remaining phosphoric acid solution is concentrated by evaporation with accompanying volatilization of hydrofluosilicic acid which is recycled.

11. A method for the manufacture of substantially pure calcium fluosilicate and phosphoric acid from phosphate rock having the approximate formula $3Ca_3(PO_4)_2 \cdot CaF_2$ and containing silica which comprises mixing comminuted phosphate rock with an acid solution consisting essentially of hydrofluosilicic acid and water in the approximate proportions of 300 parts by weight of phosphate rock to 480 parts of hydrofluosilicic acid, agitating the reaction mixture until the rock is decomposed and then filtering to remove insoluble impurities, then concentrating the filtrate by evaporation and thereby causing crystallization from solution of substantially pure calcium fluosilicate, and then mechanically separating the substantially pure calcium fluosilicate crystals from the remaining phosphoric acid solution.

ERNEST A. WINTER.

References Cited in the file of this patent
UNITED STATES PATENTS

| Number | Name | Date |
|---|---|---|
| 1,018,746 | Dittmar | Feb. 27, 1912 |
| 1,149,233 | Washburn | Aug. 10, 1915 |
| 1,283,398 | Carothers | Oct. 29, 1918 |
| 1,297,464 | Hechenbleikner | Mar. 18, 1919 |
| 1,313,379 | Hechenbleikner | Aug. 19, 1919 |
| 1,487,205 | Carothers | Mar. 18, 1924 |
| 1,597,984 | La Bour | Aug. 31, 1926 |
| 1,676,556 | Howard | July 10, 1928 |
| 1,816,285 | Johnson | July 28, 1931 |
| 2,354,177 | Kawecki | July 18, 1944 |
| 2,369,791 | Moore | Feb. 20, 1945 |
| 2,410,043 | Breton et al. | Oct. 29, 1946 |